United States Patent [19]
Nishikura et al.

[11] Patent Number: 5,256,928
[45] Date of Patent: Oct. 26, 1993

[54] ULTRASONIC MOTOR WITH A VIBRATOR HAVING RECESSES

[75] Inventors: Takahiro Nishikura, Ikoma; Katsu Takeda, Osaka; Masanori Sumihara, Moriguchi; Osamu Kawasaki, Tsuzuki, all of Japan

[73] Assignee: Matsushita Electric Industrial Co., Ltd., Osaka, Japan

[21] Appl. No.: 783,192

[22] Filed: Oct. 28, 1991

[30] Foreign Application Priority Data

Oct. 26, 1990 [JP] Japan ................................ 2-288686
Oct. 26, 1990 [JP] Japan ................................ 2-288689

[51] Int. Cl.$^5$ ............................................. H01L 41/08
[52] U.S. Cl. ................................. 310/323; 310/328
[58] Field of Search ............................. 310/323, 328

[56] References Cited

U.S. PATENT DOCUMENTS

| | | | |
|---|---|---|---|
| 4,580,073 | 4/1986 | Okumura et al. | 310/323 |
| 5,006,746 | 4/1991 | Kasuga et al. | 310/323 |
| 5,148,075 | 9/1992 | Shirasaki | 310/323 |
| 5,157,300 | 10/1992 | Kataoka et al. | 310/323 |
| 5,177,023 | 12/1992 | Kawai et al. | 310/323 |

FOREIGN PATENT DOCUMENTS

| | | | |
|---|---|---|---|
| 0383309 | 8/1990 | European Pat. Off. | 310/328 |
| 59-201685 | 11/1984 | Japan . | |
| 63-174581 | 7/1988 | Japan . | |
| 0257476 | 10/1988 | Japan | 310/323 |
| 0013279 | 1/1990 | Japan | 310/369 |

Primary Examiner—Mark O. Budd
Assistant Examiner—Thomas M. Dougherty
Attorney, Agent, or Firm—Wenderoth, Lind & Ponack

[57] ABSTRACT

An ultrasonic motor has a circular vibrator and a mover which is pressed into contact with the circular vibrator. A circular elastic member which constitutes the circular vibrator has a uniform thickness along a circumferential direction thereof, and has a plurality of recesses on a face of the circular elastic member opposing the mover. According to the above structure, uniform elastic travelling waves are generated in the circular elastic member of the vibrator, and a uniform contact is attained between the vibrator and the mover, and yet the development of cracks at bottoms of the recesses is prevented. A ring-like recess is provided on another elastic member which constitutes the mover.

13 Claims, 16 Drawing Sheets

RADIAL DIRECTION

RADIAL DIRECTION

CIRCUMFERELTIAL DIRECTION

ULTRASONIC MOTOR WITH A VIBRATOR HAVING RECESSES

BACKGROUND OF THE INVENTION

1. Field of the Invention

The present, invention relates to an ultrasonic motor which generates a driving force using elastic vibration of a piezoelectric element and, more specifically, to the structure of a mover and a vibrator in the ultrasonic motor.

2. Description of the Prior Art

A known example of an ultrasonic motor's vibrator is the one disclosed by U.S. Pat. No. 4,580,073. FIG. 1 shows the structure of this conventional ultrasonic motor.

In FIG. 1, a reference numeral 2 indicates a ring vibrator, a reference numeral 3 indicates a mover (or movable member) and a reference numeral 2a represents projections. The projections extend in a direction transverse to the direction of advance of the travelling bending elastic wave and are disposed at equal angular spaces about the entire circle of the ring vibrator 2. A reference numeral 2b designates a base ring portion which is on the opposite side of the projections 2a and integral with the projections 2a. The base ring portion 2b has a piezoelectric element 4 (see FIG. 2) which has a polarized structure as shown in FIG. 2.

FIG. 2 illustrates an example of the polarized structure of the piezoelectric element 4 which oscillates nine elastic waves along the circle of the vibrator 2. Each of portions A and B contains a group of electrodes, each constituting a small polarized domain corresponding to a half-wave length of the elastic wave. Portion C is an electrode corresponding to a three-quarter wave length. Portion D is an electrode corresponding to a one-quarter wave length. Electrodes C and D are disposed there to spatially provide a phase difference of one-quarter wave (equal to 90°) length between two groups of electrodes A and B. In two groups of electrodes A and B, any two adjacent small domains are polarized in the direction of the axis of the ring vibrator 2 so that they have opposite polarities with respect to one another. The piezoelectric element 4 is rigidly attached, at the opposite side of the piezoelectric element surface shown in FIG. 2, to the base ring portion 2b. Each electrode is flush with the surface of the piezoelectric element. When the ultrasonic motor is in operation, the electrode group A is short-circuited as hatched in FIG. 2. The electrode group B is also short-circuited as hatched in FIG. 2.

Now let's assume that voltages $V_1$ and $V_2$ expressed as below are applied to the electrode groups A and B of the piezoelectric element 4, respectively.

$$V_1 = V_0 \times \sin(\omega t) \quad (1)$$

$$V_2 = V_0 \times \cos(\omega t) \quad (2)$$

where $V_0$ is the amplitude of the applied voltage, $\omega$ is an angular frequency, and t is time.

A bending travelling wave as expressed by the following equation is generated on the ring vibrator 2, and advances along the circle of the ring vibrator 2.

$$\begin{aligned}\xi &= \xi_0 \times (\cos(\omega t) \times \cos(kx) + \sin(\omega t) \times \sin(kx)) \\ &= \xi_0 \times \cos(\omega t - kx)\end{aligned} \quad (3)$$

where $\xi_0$ is the amplitude of the bending vibration, $\xi$ is an instantaneous value of the bending vibration, k is the number of waves $(2\pi/\lambda)$, $\lambda$ is the wavelength, and x is a position of interest.

A point P of projections 2a is, accordingly, in motion in an elliptical orbit. The mover 3 in contact with the point P is driven, by means of frictional force, in the opposite direction X' of the direction X in which the travelling wave advances on the ring vibrator 2.

For the purpose of increasing the rotational speed at the point P in the ultrasonic motor, the above-mentioned vibrator 2 is provided with projections 2a which involves a difficult machining process. The provision of the projections 2a causes attainment of the above goal by increasing transverse displacement.

One example of the structure of a mover of a conventional ultrasonic motor is disclosed by Japanese Laid Open Publication No. 63-174581. Discussed in that disclosure are relative relationships of various shapes of the mover, which has a structure of a cantilever flange made of aluminum or aluminum alloy. It is also disclosed that the generation of abnormal mechanical noise is prevented by optimizing rigidity of the flange.

An important factor in the structure of the conventional ultrasonic motor is the accuracy of the flatners between the projections 2a extending from the base ring portion 2b and of the mover 3. Both mechanical strength variations in attachment portions where the projections 2a join the base ring portion 2b and variations in machining accuracy of the height of the projections 2a affect a resonant frequency at which both electrode groups A and B vibrate, thereby varying the vibration displacement and consequently reducing the efficiency of the ultrasonic motor. To overcome the above problem, the flatness accuracy needs improving. Improvement in the flatness accuracy involves longer machining times and very rigorous machining accuracy requirements. These requirements in the production stage are incompatible with low production costs and a mass production process. The resonant frequency of the projections (a function of the width, depth, and height of each projection) should not ,meet with the driving frequency of the vibrator; actual the machining process, by nature, sets a design limit of the minimum space allowed between adjacent projections; and sufficient mechanical strength of the projections is required for the output to be efficiently picked up. All these requirements set a limit an the number of projections allowed. On one hand, the use of projections contributes to the increase of the rotational speed of the motor. On the other hand, however, the structure of the projections causes amplitude variations in the vibration, because of changes in the resonance characteristics directly resulting from a periodic change in the rigidity of the vibrator. The unavoidable design limit imposed on the number of projections adversely affects motor characteristics, for example, causing cogging or other problems, particularly when the motor is operated at a low speed operation.

To sum up, in the above ultrasonic motor, cracks tend to develop at the root of the projection, and parts of the ring vibrator to which the piezoelectric element is fitted are limited because of a periodic change in a circumferential direction of rigidity in the ring vibrator, thus assembly work for the piezoelectric element is troublesome.

When the mover is of the cantilever flange structure, the problem is as follows:

With the vibrator pressed into contact with the cantilever flange mover, the cantilever flange mover is deflected and distorted with respect to its fixed end, and fails to be uniformly in contact with the vibrator. Therefore, reliable a contact state between the vibrator and the mover is not assured. To improve on this problem, the contact surface is very narrow. A narrow contact surface, however, forces more contact pressure, leading to wear of each contact surface of both the vibrator and the mover, and even leading to seizure of both. To avoid such problems, the contact surface needs to be coated with a hard material, such as an oxide compound. Such an additional process is not acceptable from the standpoint of cost and mass production. If such hardening process is employed, a motor service life is determined by the capability of the hard material to remain adhered to the vibrator. That adherence capability is definitely unpredictable and unstable. Furthermore, the flange type mover is complex in its structure, and presents various difficulties in the machining process. For example, when a small pressure of several Newtons is applied or the motor diameter is miniaturized, the thickness of the flange mover is extremely thinned. Such a technique is not applicable in a wide range of applications, because prior-art structures have numerous limitations on the machining process, the shape of the ultrasonic motor and the pressure ranges applied.

SUMMARY OF THE INVENTION

The present invention has been developed with a view to substantially solving the above described disadvantages and has for its essential object to provide a low cost, reliable, excellent low-speed rotation characteristic, easy-to-machine, and mass-production oriented ultrasonic motor in which all parts in a circumferential direction of a ring vibrator have the same thickness (i.e. a contact face portion of the contact face of the ring vibrator extends continuously about the circumference of the ring vibrator); and, as a result, a crack hardly develops on the ring vibrator, and the portions for disposing an piezoelectric element are not limited.

In order to achieve the aforementioned object, there is provided an ultrasonic motor, wherein a mover (or movable member) is pressed into contact with a circular vibrator which is made of a circular elastic member and a piezoelectric element attached to the elastic member, and the mover is driven by generating elastic circumferentially travelling waves on the circular vibrator as a result of applying electric fields to the piezoelectric element, characterized in that: the circular elastic member has a substantially uniform thickness along a circumferential direction thereof, and the circular elastic member has a plurality of recesses on a face thereof contacting the mover.

Further, there is provided an ultrasonic motor, wherein a mover is pressed into contact with a circular vibrator, the mover including a second elastic member and a friction member bonded to a face of the second elastic member, the circular vibrator including a first circular elastic member and a piezoelectric element attached to the first circular elastic member, and the mover is driven by generating elastic circumferentially travelling waves on the circular vibrator as a result of applying an electric field to the piezoelectric element, characterized in that: a recess cover is provided on the face of the second elastic member to which the friction member is bonded.

Furthermore, there is provided an ultrasonic motor, wherein a mover is pressed into contact with a circular vibrator, the mover including a second elastic member and a friction member bonded to a face of the second elastic member, the circular vibrator including a first circular elastic member and a piezoelectric element attached to the first circular elastic member, and the mover is driven by generating elastic circumferentially travelling waves in the circular vibrator as a result of applying an electric field to the piezoelectric element, characterized in that: a plurality of first recess as is provided on a face of the first elastic member which opposes the mover, a second ring-like recess is provided on the face of the second elastic member to which the friction member is bonded, and a projected portion is provided on the friction member so that the projected portion corresponds to the first recess of the first elastic member of the vibrator.

BRIEF DESCRIPTION OF THE DRAWINGS

The present invention will become more fully understood from the detailed description given hereinbelow and the accompanying drawings which are given, by way of illustration only, and thus do not limit the present invention, and wherein:

FIG. 3 (*b*) is a cross-sectional view (or movable member) showing a vibrator of the ultrasonic motor of the first embodiment;

FIG. 7 (*b*) is a cross-sectional view taken on the line 7—7 in FIG. 7 (*a*);

FIG. 8 (*b*) is a cross-sectional taken on the line 8—8 in FIG. 8 (*a*);

FIG. 9 (*b*) is a cross-sectional view of the vibrator of FIG. 9 (*a*);

FIG. 10 (b) is a cross-sectional view showing the vibrator of FIG. 10 (a).

FIG. 13 (b) is a cross-sectional view showing the vibrator of the ultrasonic motor of the fifth embodiment;

FIG. 14 (b) is a cross-sectional view showing the vibrator of the ultrasonic motor of the sixth embodiment;

DETAILED DESCRIPTION OF THE PREFERRED EMBODIMENTS

Figure 3A:
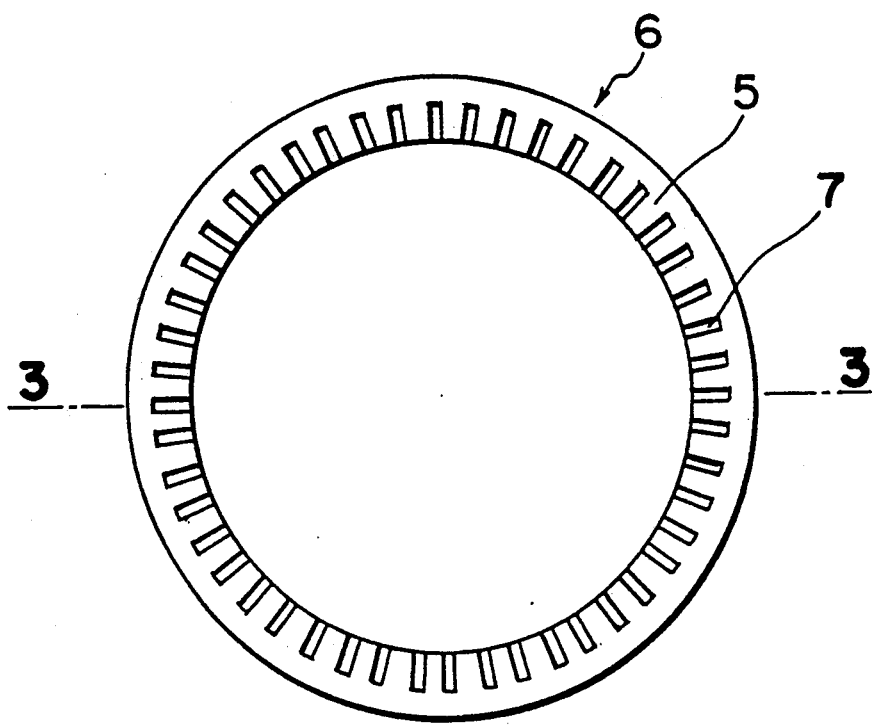
FIG. 3 (*a*) is a top view showing a vibrator of an ultrasonic motor of a first embodiment according to the present invention.
Figure 3B:
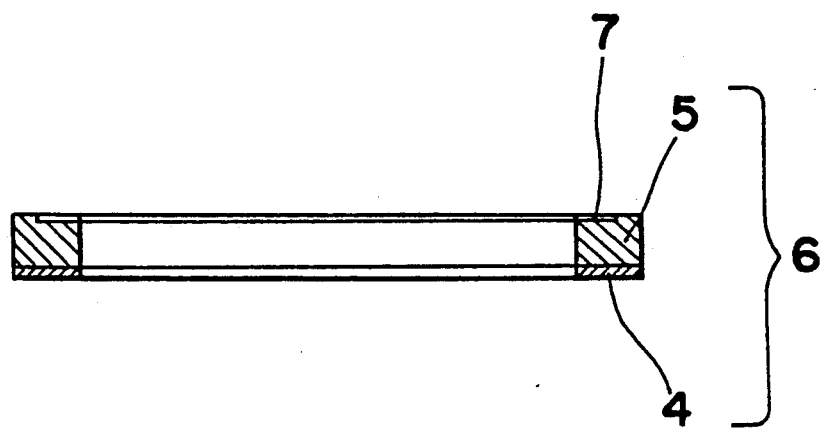

Referring now to the drawings, the first embodiment according to the present invention is described in detail below. FIG. 3 (a) is a top view of a vibrator of a ring-type ultrasonic motor to which the present invention is applied and which vibrator vibrates radially at the first vibration mode and circumferentially at the third or higher order of vibration mode. FIG. 3 (b) is a cross-sectional view of FIG. 3 (a). In FIGS. 3 (a) and (b), a ring-like vibrator 6 consists of an elastic member 5 and a piezoelectric element 4. The elastic member 5 of the ring-like vibrator 6 is provided with a plurality of recesses 7, which extend radially from an inner edge outwardly, but which, do not reach an outer edge of the elastic member 5 as shown in FIG. 3 (a). The recesses 7 may be arranged at either equal or unequal angular spacing along the circumferential direction of the ring-like vibrator 6, though the equal angular spacing arrangement is preferred.

Figure 1:
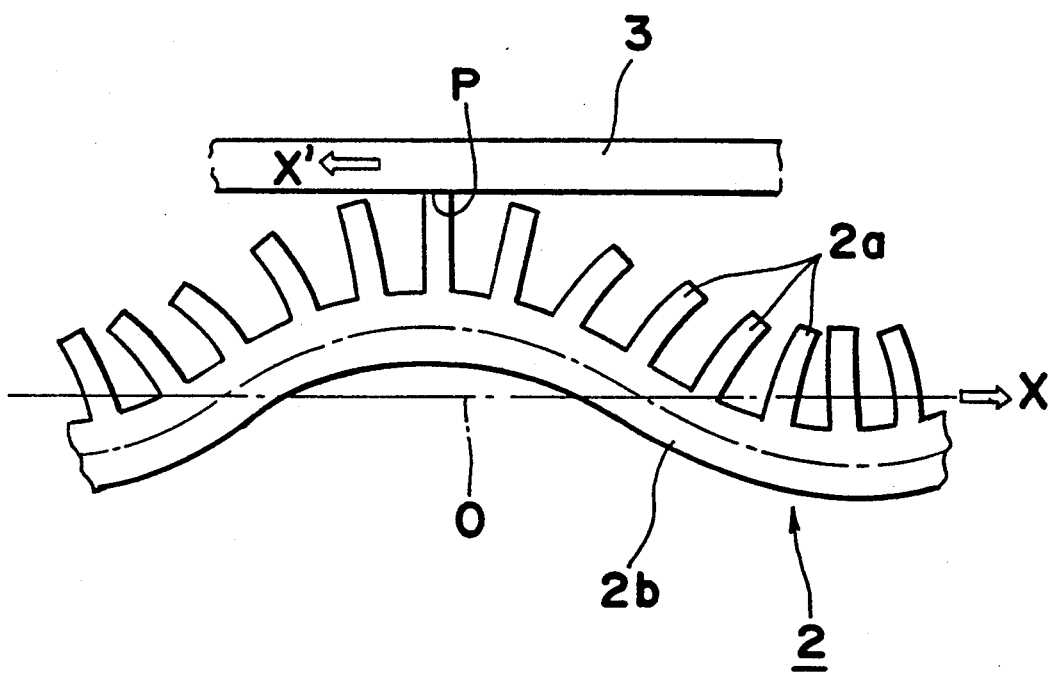
FIG. 1 is a cross-sectional view showing a structure and operational principle of a conventional ultrasonic motor having projections.
Figure 2:
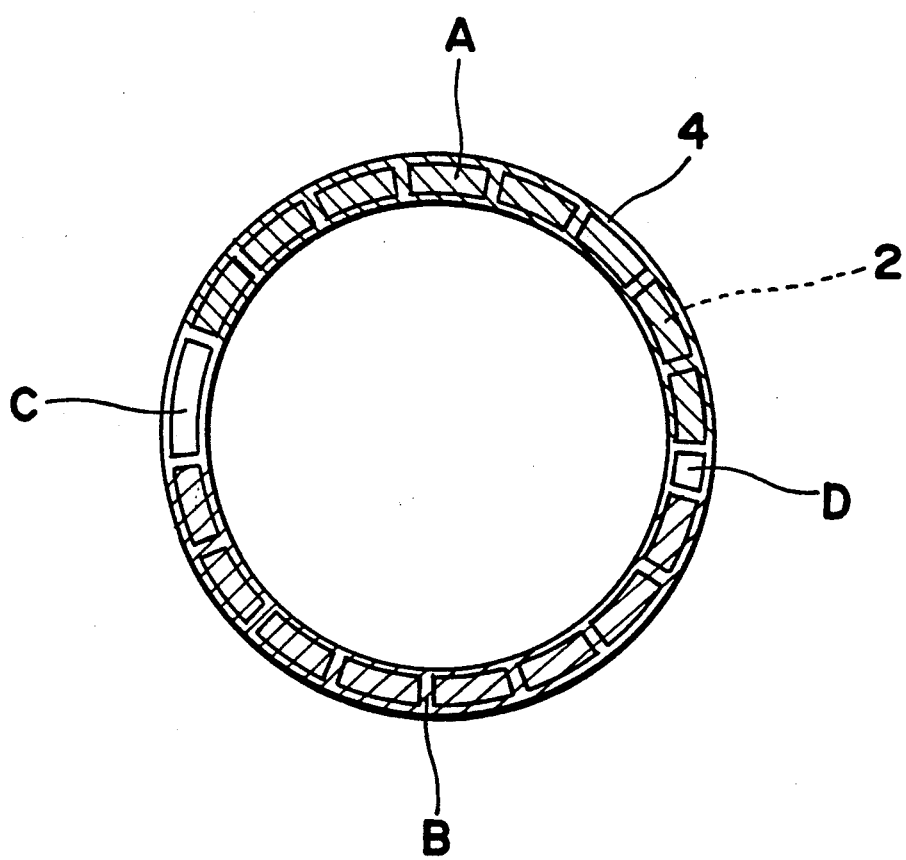
FIG. 2 is a view showing a construction of a ring-like piezoelectric element used in an ultrasonic motor.

A mover (or movable member) is pressed into contact with the elastic member 5 of the vibrator 6, which has recesses 7 not reaching to the outer edge of the elastic member 5 as illustrated in FIG. 3 (a). Although the mover is not shown in FIGS. 2, 3 (a) and (b), the mover has the same structure as that of the mover 3 in the conventional ultrasonic motor shown in FIG. 1. Voltages $V_1$ and $V_2$, described in the description of the prior art, are applied to the piezoelectric element 4 of the ring-type ultrasonic motor having the structure as just mentioned. Elastic travelling waves are thus generated in the vibrator 6, thereby driving the mover.

Figure 4A:
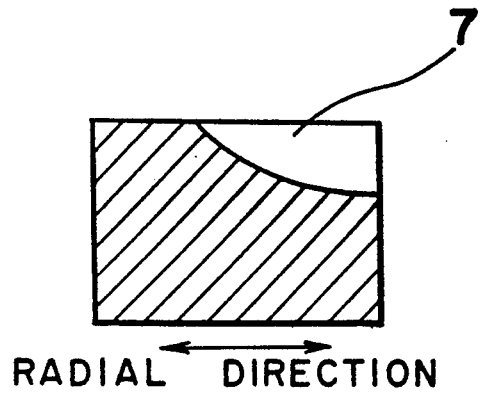
FIGS. 4 (*a*), (*b*) and (*c*) are cross-sectional views showing recesses used in the present invention.
Figure 4B:
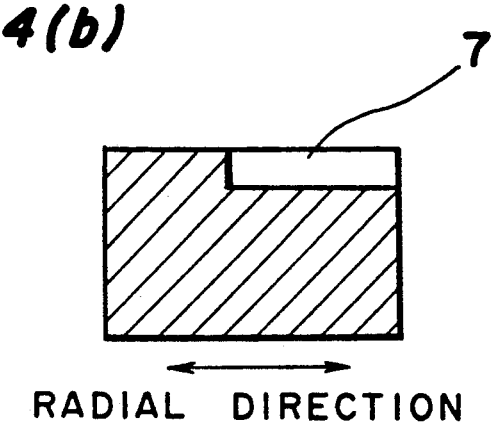
Figure 4C:
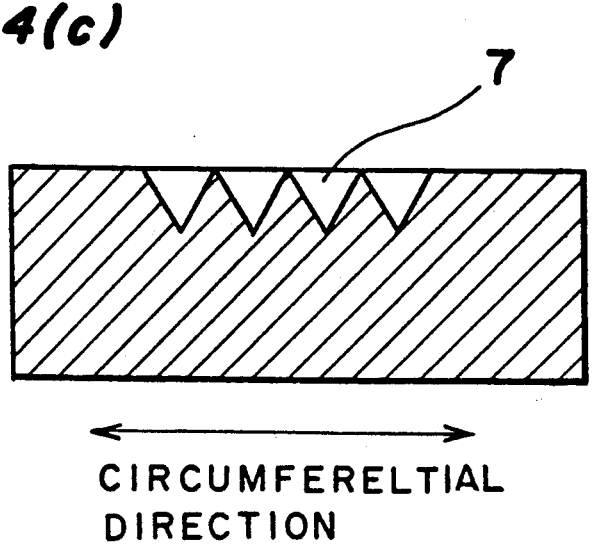

As illustrated in FIG. 4 (a), the recesses 7 may be spherical. As illustrated in FIG. 4 (b), the recesses 7 may be rectangular. As shown in FIG. 4 (c), the recesses 7 may have multiple V-shaped notches as viewed in cross section in a circumferential direction. The cross-sectional shapes of the recesses 7 are not limited to the forms mentioned above and other forms may be acceptable.

Figure 5:
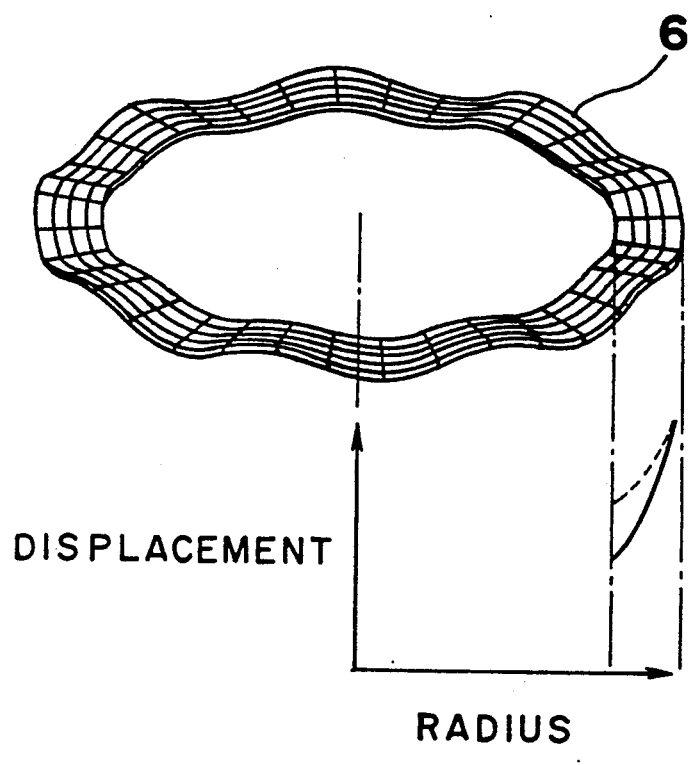
FIG. 5 is a diagram showing how vibrational displacement is radially distributed in the ring-like vibrator of the ultrasonic motor.

FIG. 5 is a diagram showing how vibration displacement is radially distributed in the ring-like vibrator 6. As seen from FIG. 5, the first mode vibration in the radial direction causes the vibration displacement to be larger toward the radially outer portion of the vibrator 6. Since the recesses 7 are disposed on the inner side of the ring vibrator 6, the rigidity is weakened at the inner side of the ring vibrator 6 by a factor proportional to the third power of the thickness thereof. Therefore, vibration displacement tends to be larger on the inner side of the vibrator. As a result, the actual vibration displacement distribution in the radial direction is more even than that illustrated in FIG. 5. The uniform distribution in the radial direction of the vibration displacement prevents offset of the vibrator 6 with respect to the mover. The offset would occur while the mover moves relative to the vibrator 6 if an uneven distribution in the radial direction of vibration distribution took place. The even distribution in the radial direction of the vibration displacement assures uniform and reliable contact between the vibrator 6 and the mover. Since the vibrator 6 drives, at its inner side, the mover in the above-mentioned structure, the distribution of vibration displacements remains stabilized against changes in load, and more reliable operation is thus assured, compared with the case where the outer side of a ring vibrator is used for driving.

A simple structure like the ring vibrator 6 mentioned above overcomes manufacturing difficulties, for example, rigorous machining accuracy, and high costs of production such as for the conventional ultrasonic motor. Since the recesses 7 may be small and require no precision machining, integral molding such as powder metallurgy, which serves to lower the production costs, may be employed.

Further, the depth of the recesses 7 is acceptable if it is greater than the magnitude of deformation (on the order of a few $\mu$m) which the mover undergoes when pressed. There is no logical reason for making recesses far deeper than that magnitude.

Furthermore, the number of the recesses 7 has a far wider allowable range than the number of projections in the conventional motor, because the very shallow depth of the recesses 7 hardly affects the mechanical strength of the vibrator 6, and far smaller space is practicable between the recesses 7. Therefore, it is possible to provide an excellent ultrasonic motor having little cogging at low speed rotation by increasing the number of recesses 7. Such a low cogging feature is not given by the conventional ultrasonic motor which has projections on its vibrator.

Figure 6:
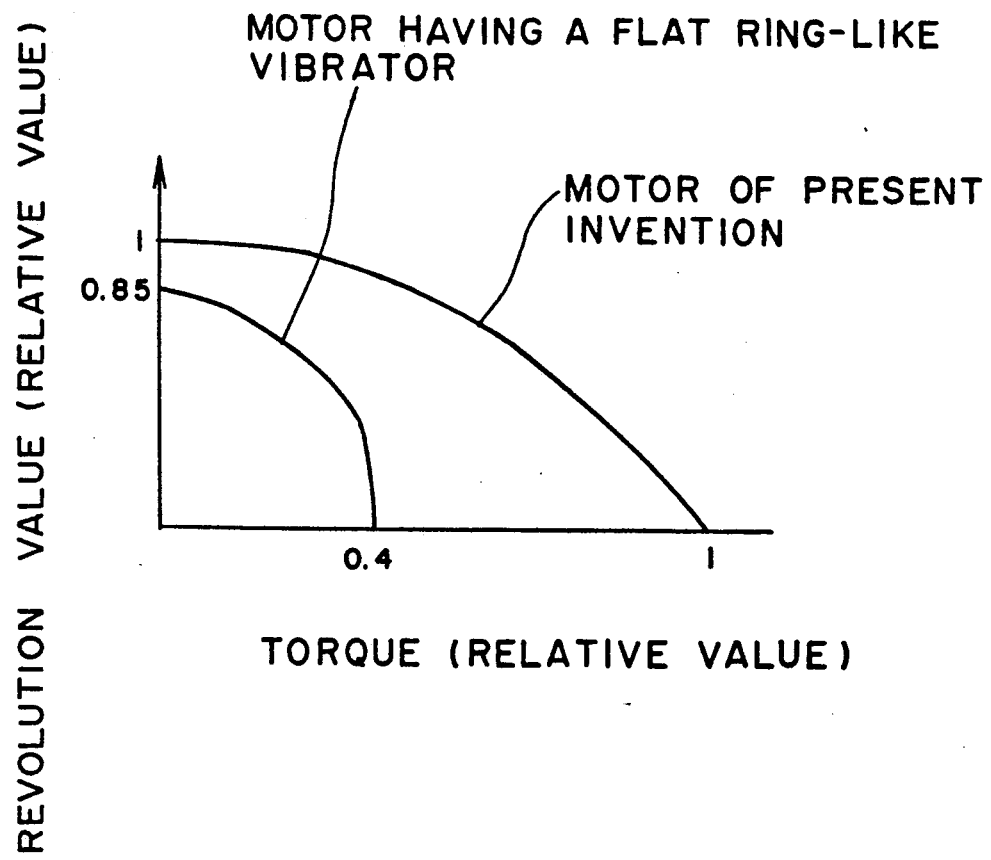
FIG. 6 is a diagram showing comparative motor characteristics, one obtained from a ring-like flat vibrator and the other obtained from a vibrator having recesses according to the present invention.

Furthermore, the use of the recesses 7 provides the effect of increased driving force of the vibrator 6 resulting from the increased frictional force, as illustrated in FIG. 6. As seen from FIG. 6, unlike an ultrasonic motor having a simply flat ring-like vibrator, the ring ultrasonic motor having recesses 7 exhibits no sharp reduction due to slippage in the rotational speed output on the high torque region and operates reliably.

The present invention substantially reduces the adverse effects to the resonance characteristics, experienced particularly in a conventional ultrasonic motor in which the projections 2a result in partial rigidity variations of the vibrator 6. Thus, the present invention practically eliminates audible vibration produced by the beat frequency component, i.e., frequency difference, between one resonance frequency of the electrode group A and the other resonance frequency of the electrode group B. The present invention also eliminates mechanical noise caused by the resonance oscillation of the entire mechanical structure due to unwanted standing wave components resulting from vibration displacement variations. The present invention also eliminates rotational irregularities due to instantaneous variations in the state of contact between the vibrator and the mover.

Figure 7A:
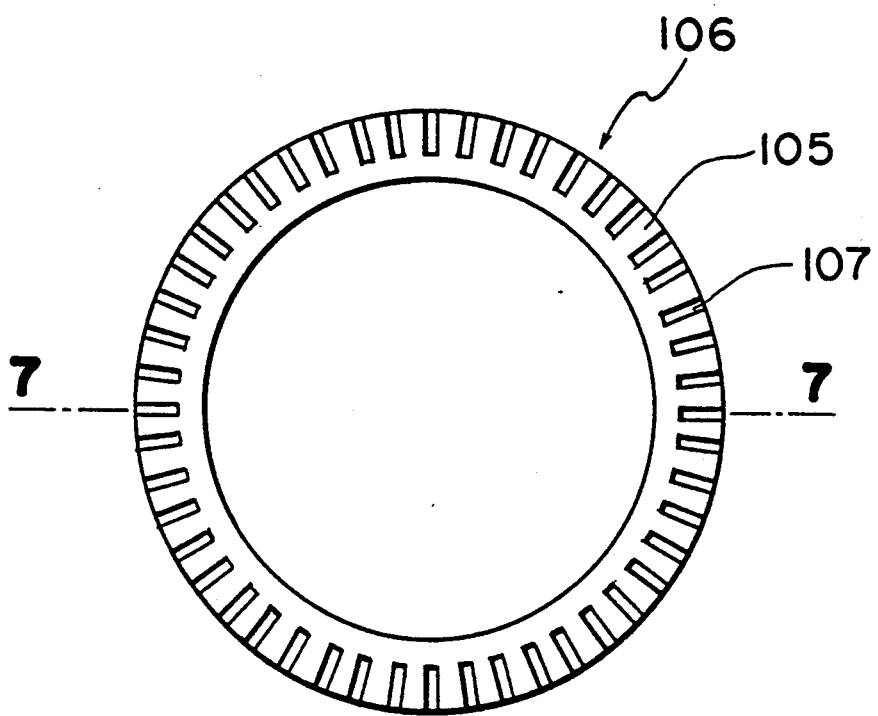
FIG. 7 (*a*) is a top view showing a vibrator of an ultrasonic motor of a second embodiment according to the present invention.
Figure 7B:
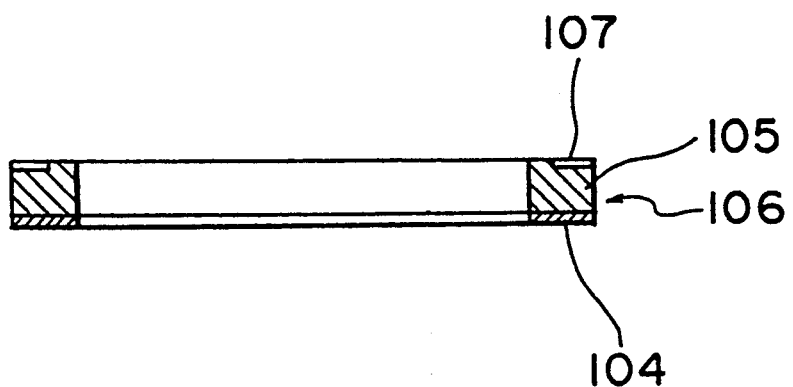

FIGS. 7 (a) and (b) show a ring vibrator 106 in a second embodiment of the present invention. The ring vibrator 106 includes an elastic member 105 and a piezoelectric element 104. The elastic member 105 has a plurality of recesses 107 which extend inwardly from an outer edge of the elastic member 105 and which do not reach an inner edge of the elastic member 105. Since a mover is pressed into contact with an outer peripheral portion of the vibrator 106 where the recesses 107 are disposed, the vibrator 106 drives, at its maximum amplitude points, the mover, as shown in FIG. 5. Thus, the rotational speed of the mover is increased by a factor proportional to the ratio of the amplitude at an inner peripheral portion and the amplitude at the outer peripheral portion, as compared with a rotational speed obtained by the use of the inner peripheral portion of the vibrator 106. Since the vibrator 106 drives, at its outer peripheral portion the mover, larger output torque results; the resulting output torque is increased to the output torque (obtained at the inner peripheral contact portion) multiplied by a factor of the outer circle's radius divided by the inner circle's radius. A high output ultrasonic motor is thus provided.

Figure 8A:
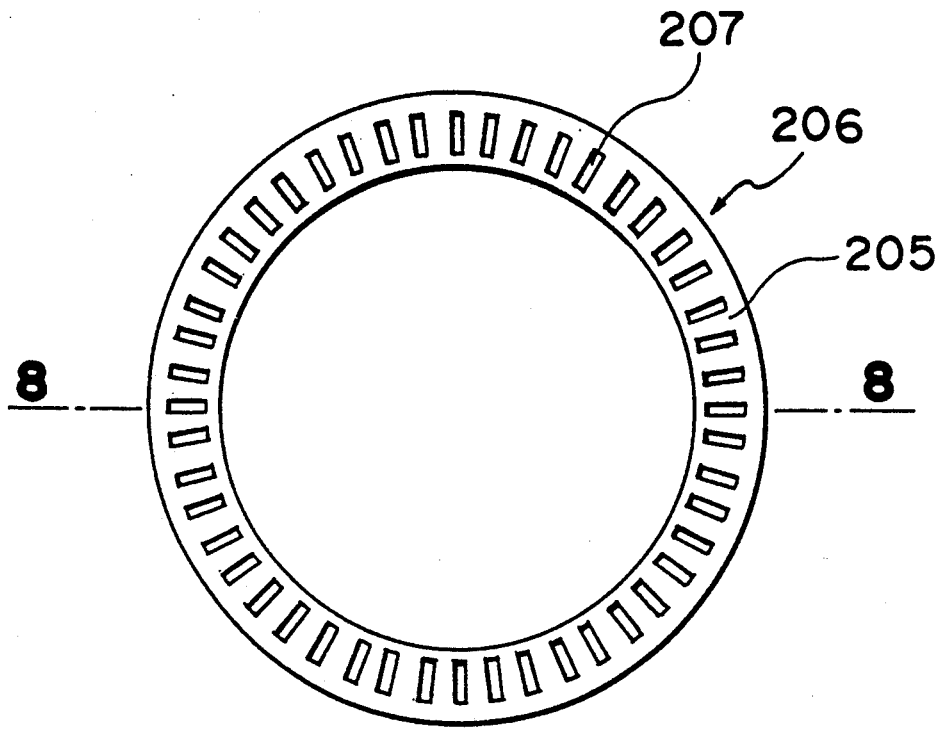
FIG. 8 (*a*) is a top view showing a vibrator of an ultrasonic motor of a third embodiment according to the present invention.
Figure 8B:
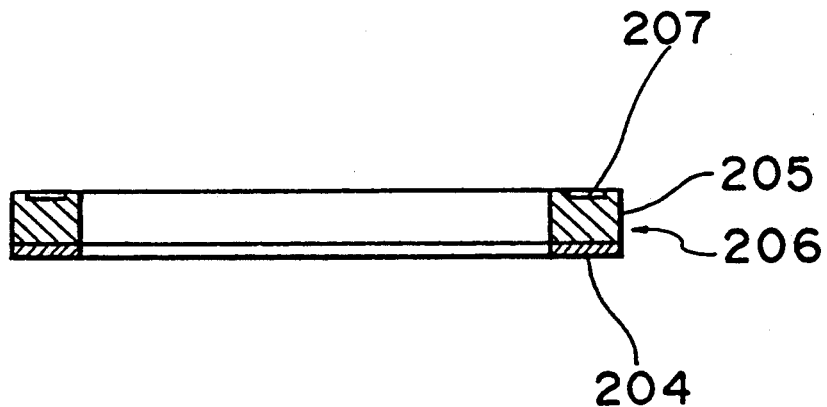
Figure 9A:
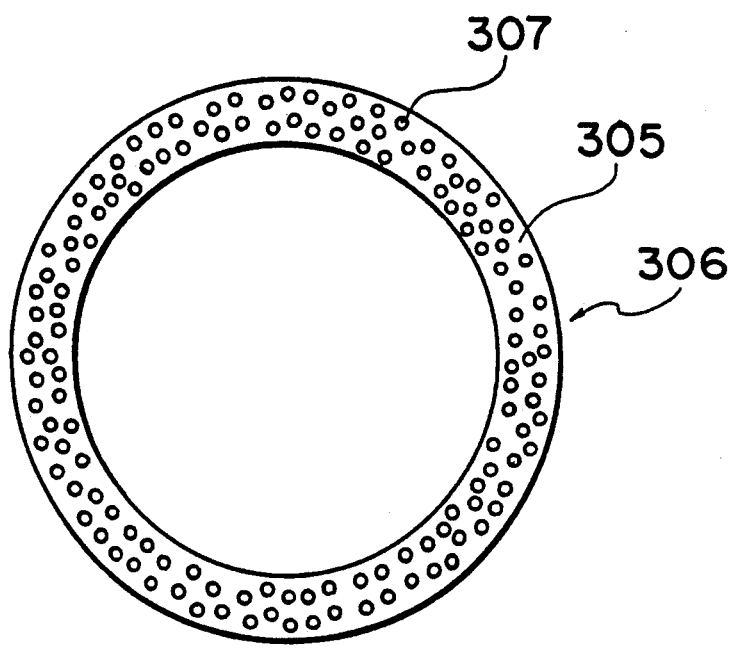
FIG. 9 (*a*) is a top view showing another vibrator of an ultrasonic motor of the third embodiment according to the present invention.
Figure 9B:

FIGS. 8 (a) and (b) show a ring vibrator 206 in a third embodiment of the present invention. The vibrator 206 includes an elastic member 205 and a piezoelectric element 204. The elastic member 205 has a plurality of recesses 207 which are radially extended in the middle of the elastic member 205 and which reach to neither an inner edge nor an outer edge of the elastic member 205. A mover similar to that in the second embodiment is pressed into contact with the middle portion of the elastic member 205 where the recesses 207 are disposed. This structure offers, at the same time, the advantages of both the first embodiment and the second embodiment combined. As the other example to the recess arrangement in which the recesses 207 are disposed at equal angularly spaced intervals on the vibrator 206 as shown in FIG. 8, recesses 207 may be disposed in a random manner on the ring vibrator 306 as illustrated in FIGS. 9 (a) and (b). FIGS. 9 (a) and (b) show an example of recesses which are formed as semispherical dimples.

Figure 10A:
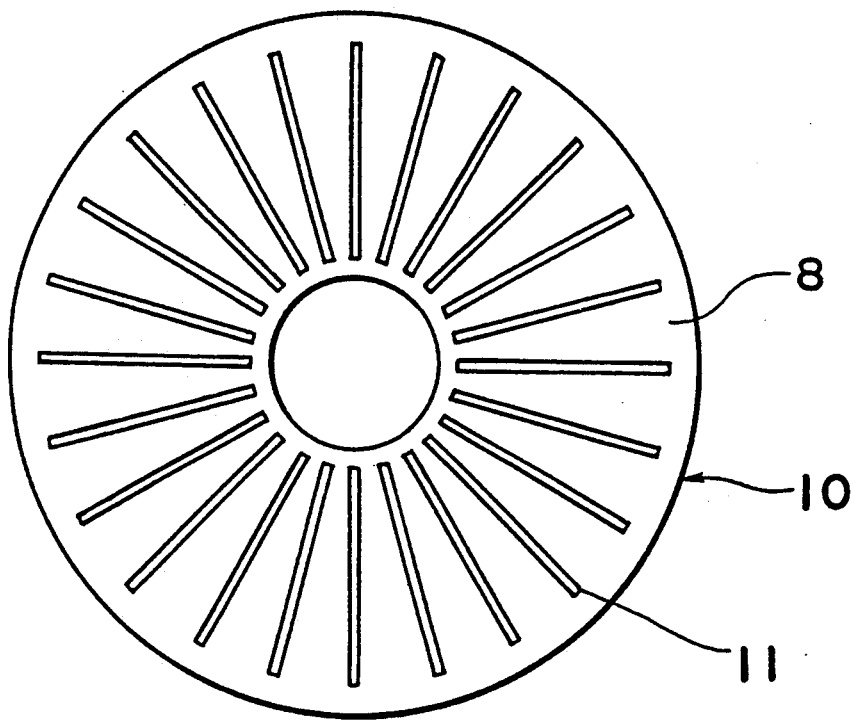
FIG. 10 (*a*) is a top view showing a vibrator of an ultrasonic motor of a fourth embodiment according to the present invention.
Figure 10B:
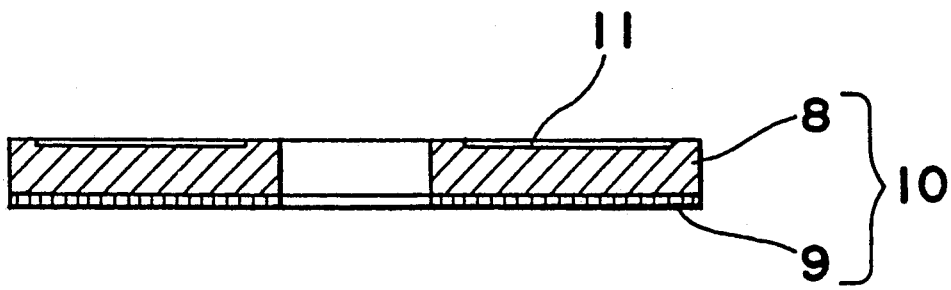
Figure 11:
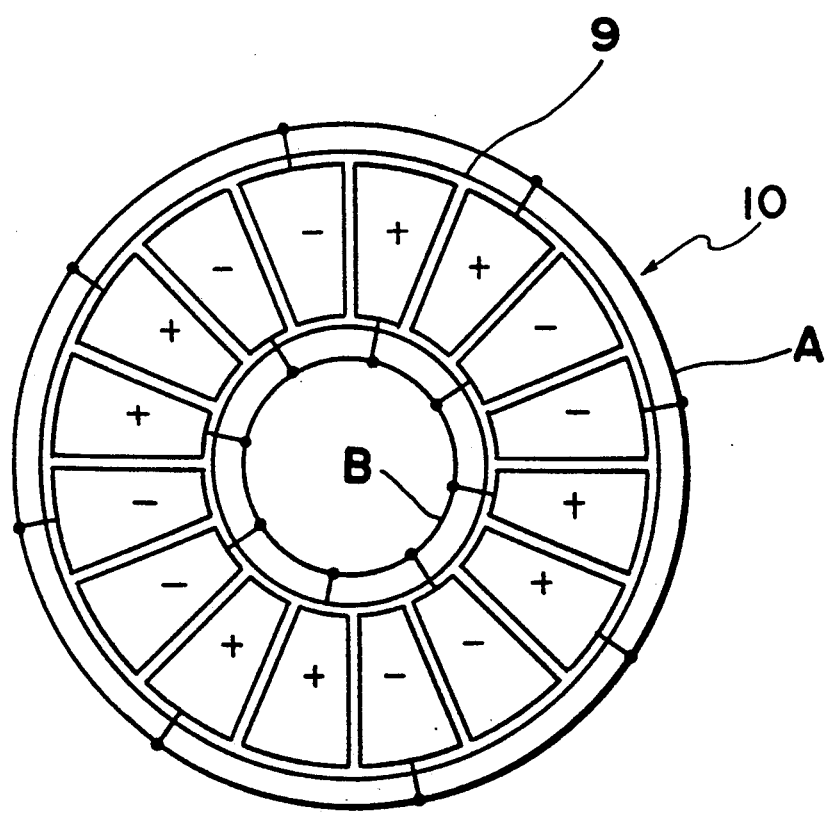
FIG. 11 is a diagram showing the shape and electrode structure of a piezoelectric element used in a disk-type ultrasonic motor.
Figure 12A:
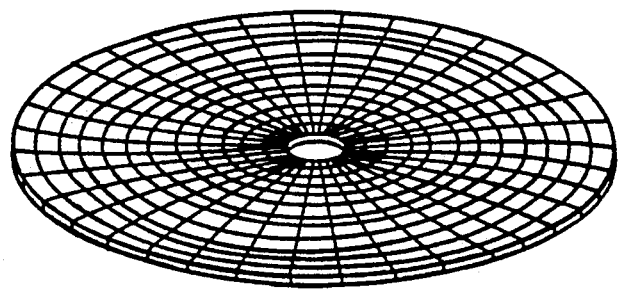
FIGS. 12 (a) and 12 (b) are diagrams showing how vibration displacement is radially distributed in a second vibration mode of the disk-type ultrasonic motor.
Figure 12B:
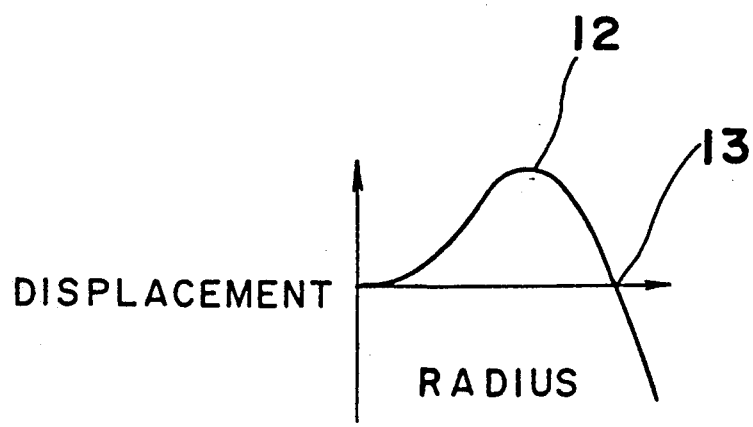

Described below in detail is a fourth embodiment, wherein the present invention is applied to a disk vibrator. FIG. 10 (a) is a top view of the disk vibrator which is applied to a disk-type ultrasonic motor and which vibrates radially at the second vibration mode and circumferentially at the third or higher order of vibration mode. FIG. 10 (b) is a cross-sectional view of FIG. 10 (a). The disk vibrator 10 consists of an elastic member 8 and a piezoelectric element 9. The elastic member 8 has a plurality of recesses 11. Referring to FIG. 11, the piezoelectric element 9 has a electrode structure for generating four travelling elastic waves along a circumferential direction thereof. FIGS. 12 (a) and (b) illustrate the distribution of vibration displacement of the disk vibrator 10 of FIG. 10 in a radial second vibration mode. FIG. 12 (b) indicates that the maximum amplitude points 12 exist midway along the radial direction from an inner circle to an outer circle of the disk vibrator 10. In this fourth embodiment, a plurality of recesses 11 are arranged on the vibrator 10 so that some of the recesses 11 mate partially with the contact portion of a mover or come to, at least, the vicinity of the maximum amplitude points.

The shape and layout of the recesses in the previously mentioned embodiments (from the first to third embodiments) are all equally applicable to the recesses 11 in the fourth embodiment.

The mover is pressed into contact with the disk vibrator 10 described above. Integrally attached to the elastic member 8 is the piezoelectric element 9 which is polarized in such a manner that polarization of + electrode, + electrode, − electrode, − electrode, ... − electrode and − electrode takes place thereon as shown in FIG. 11. A electrode group A is formed by connecting every other electrode so that + electrodes and − electrodes are coupled, and then an electrode group B is formed by connecting the remaining electrodes so that + electrodes and − electrodes are coupled as shown in FIG. 11. The electrode group A and the electrode group B are thus 90° different in phase, both spatially and virtually electrically. An elastic travelling wave is generated by applying voltages $V_1$ and $V_2$, already described in the prior art example, to the electrode group A and the electrode group B, respectively. The travelling wave generated on the vibrator 10 drives the mover.

The use of a simple structure like the disk vibrator 10 mentioned above provides advantages similar to those in the first embodiment through third embodiment. As shown in FIG. 12, the use of the second mode of vibration along the radial direction results in a nodal circle 13 being conveniently used for the purpose of fixing the vibrator 10; this advantage one which is lacking in the first embodiment through the third embodiment. The ring vibrator 2 of the prior art must have a vibrating portion thereof fixed and, as a result, vibration of the ring vibrator 2 is prevented, thus lowering the efficiency of the ultrasonic motor. On the other hand, according to the above structure having the nodal circle 13, the efficiency of the disk-like ultrasonic motor is remarkably improved.

Figure 13A:
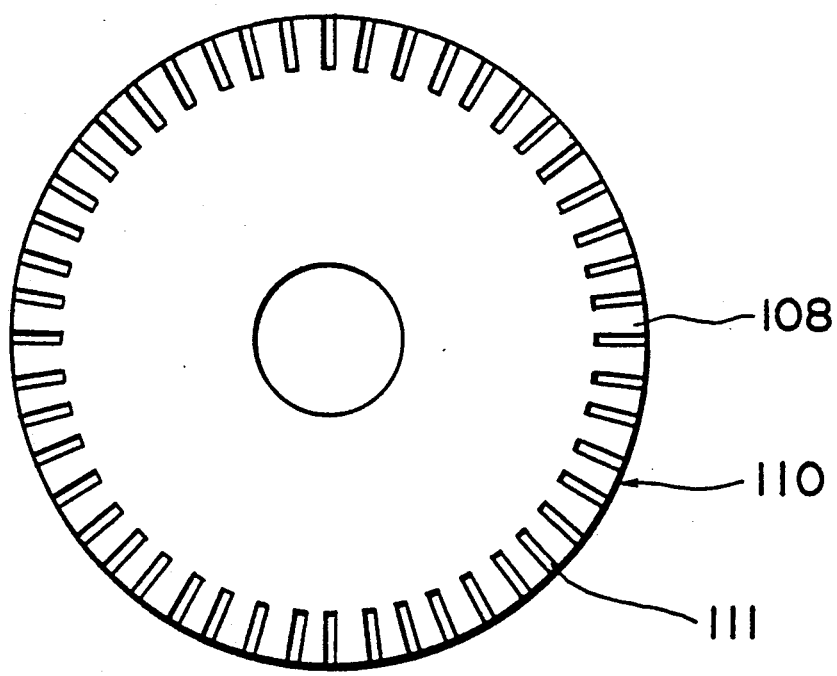
FIG. 13 (a) is a top view showing a vibrator of an ultrasonic motor of a fifth embodiment according to the present invention.
Figure 13B:
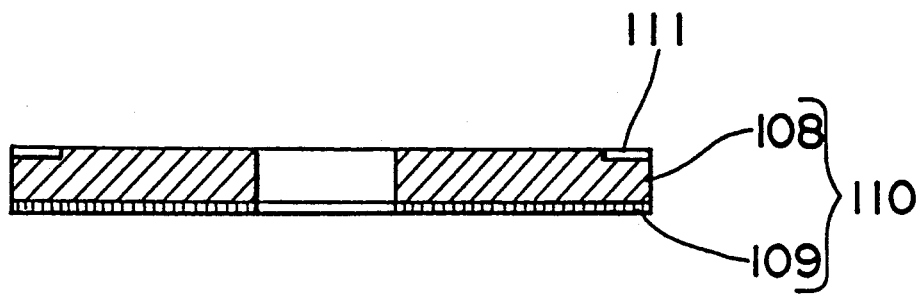

FIG. 13 (a) is a top view showing a fifth embodiment of the present invention, wherein the vibrator 110 vibrates at the first mode of vibration along the radial direction thereof. FIG. 13 (b) is a cross-sectional view of FIG. 13 (a). The vibrator 110 consists of an elastic member 108 and a piezoelectric element 109. The elastic member 108 has a plurality of recesses 111 in an outer peripheral portion thereof.

The fifth embodiment uses the first mode of vibration in the radial direction in the same manner as the first through third embodiments do. In the fifth embodiment, however, the inner portion of the disk vibrator 110 hardly vibrates. Therefore, in the same manner as the second mode of vibration, the vibrator 110 can be anchored, in this case, at its inner portion. The output torque is increased to the output torque (obtained in the fourth embodiment) multiplied by a factor of the contact circle's radius in the fifth embodiment divided by the contact circle's radius in the fourth embodiment. A high output torque ultrasonic motor is thus provided.

Figure 14A:
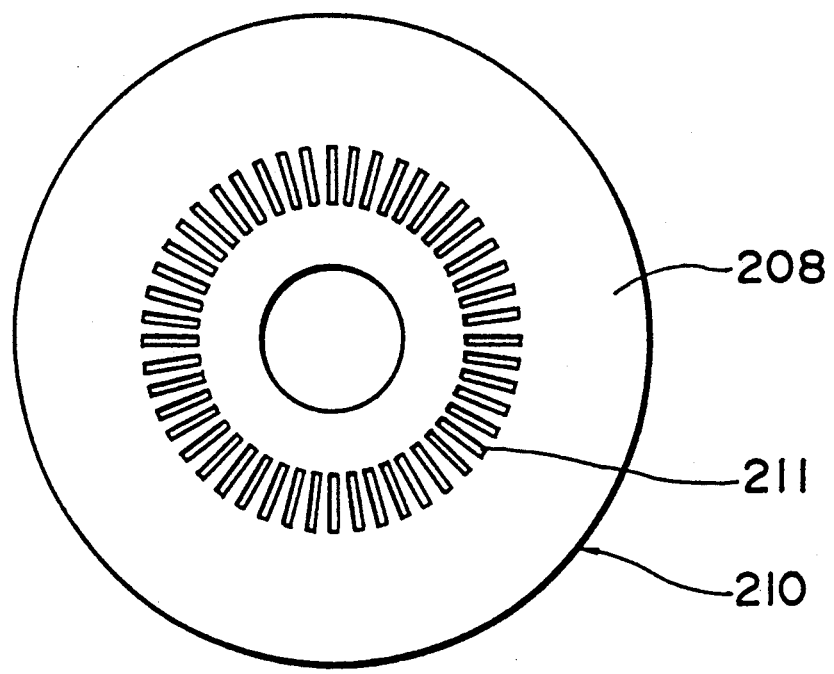
FIG. 14 (a) is a top view showing a vibrator of an ultrasonic motor of a sixth embodiment according to the present invention.
Figure 14B:
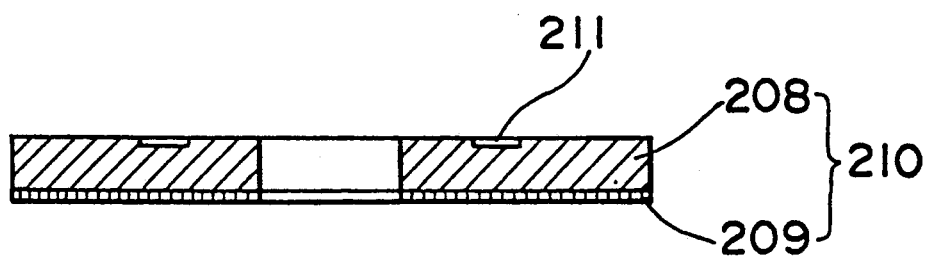

FIG. 14 (a) is a top view showing a vibrator 210 in a sixth embodiment of the present invention, wherein a plurality of recesses 211 are disposed only in the vicinity of maximum amplitude points in a vibrator 210. FIG. 14 (b) is a cross-sectional view of FIG. 14 (a). Since the recesses 211 are limited to the maximum amplitude portion, influence on resonance characteristics due to the electrode groups A and B are reduced, and almost agree with the resonance characteristics of an ideal disk-like vibrator. Therefore, stable elastic travelling waves are generated, contributing to enhanced stability of the motor characteristics.

In the first through sixth embodiments, the mover may be a friction member made of wear resisting material or an elastic member with friction material glued on it.

Figure 15:
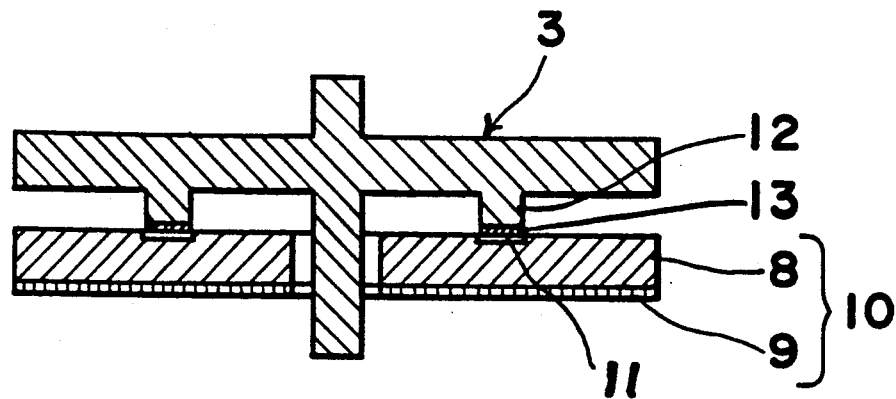
FIG. 15 is a cross-sectional view showing an ultrasonic motor of a seventh embodiment according to the present invention.

In a seventh embodiment illustrated in FIG. 15, a plurality of recesses 11 disposed on the vibrator 10 are designed to mate with a ring-like projection 12 disposed on the contact side of a mover 3. Such an arrangement allows the mover 3 to contact, at its ring-like projection 12 only, the vibrator 10, reducing variations in the motor characteristics. Another advantage which the above arrangement offers is that no strict flatness accuracy is required in machining either the vibrator 10 or the mover 3.

In the above first through seventh embodiments, the recesses 7, 107, 207, 307, 11, 111 or 211 are disposed on the vibrator 6, 106, 206, 306, 10, 110 or 210. Conversely, the recesses 7, 107, 207, 307, 11, 111 or 211 may be disposed on one side of the mover 3 which mates with the vibrator 6, 106, 206, 306, 10, 110 or 210, and the friction material 13 may be installed on the vibrator 6, 106, 206, 306, 10, 110 or 210. In this case, the recesses 7, 107, 207, 307 in the vibrators 6, 106, 206, 306 or the recesses 11, 111, 211 in the vibrator 10, 110, 210 may be omitted.

Figure 16:
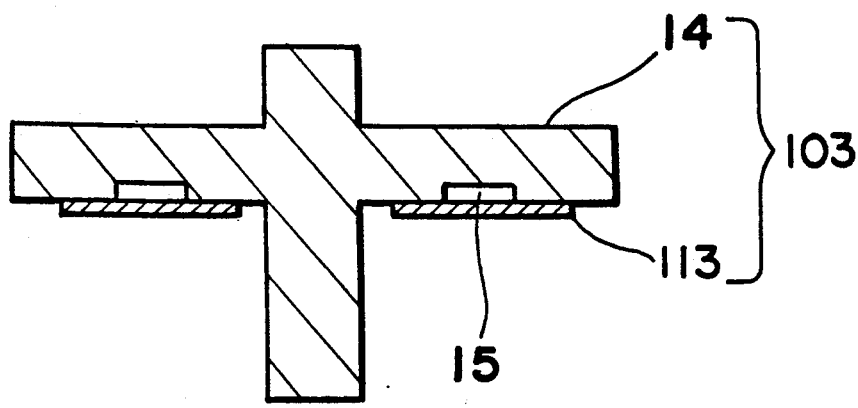
FIG. 16 is a cross-sectional view showing a mover in an ultrasonic motor of an eighth embodiment according to the present invention.

FIG. 16 is a cross-sectional view showing a mover 103 in a disk-type ultrasonic motor of an eighth embodiment according to the present invention. In FIG. 16, the present invention comprises a vibrator (not shown) composed of a first disk-like elastic member with projections on its maximum amplitude portion, a disk-like piezoelectric element bonded on the elastic member, and a mover 103 made up of a second elastic member 14 and a friction material 113, wherein the second elastic member 14 has a ring-like recess 15 opposed to the projection of the vibrator and, also, wherein the friction material 113 is bonded on the second elastic member 14 so that at least the ring-like recess 15 is entirely covered with the friction material 113. In the ultrasonic motor having the mover 103 constructed as mentioned above, the mover 103 is pressed, via its friction material 13, into contact with the vibrator having projections. As a result, the mover 103 is driven by the piezoelectric element 9 having the polarized structure described in the fourth embodiment.

The above structure of the mover 103 in the present invention provides the following advantages:

The recess 15 along with the friction material 113 prevents unwanted vibrations due to amplitude variations in each standing wave resulting from area differences between the electrode group A and the electrode group B shown in FIG. 11 and/or a positioning error of the piezoelectric element introduced in gluing it onto the vibrator having the projection. The recess 15 along with the friction material 113 also improves the radial inclination of the vibration displacement distribution which is theoretically unavoidable depending on the mode of vibration. The friction material 113 fixed at both ends deforms itself in concert with the vibration displacement distribution and absorbs the circumferential waviness with its entire contact area, thereby assuring uniform contact. Such a function contributes to increasing the tolerance in flatness accuracy to which the projection of the vibrator and the mover are machined. The above function also eliminates audible mechanical noise generated by resonating mechanical structure resulting from contact irregularity between the projection and the mover. Further, the both-end fixing structure of the friction material 113 relaxes machining accuracy requirements greatly, allowing the frictional material 113 to be flexibly machined to meet the motor's shape and dimensions and pressure specifications. If the friction material 113 is made of wear resisting material, such as carbon fiber, engineering plastic, or the like, the vibrator is prevented from damage. Since such a wear resisting material needs no additional processing such as forming an oxide coating thereon, a mass production oriented and low cost mover is implemented.

Figure 17:
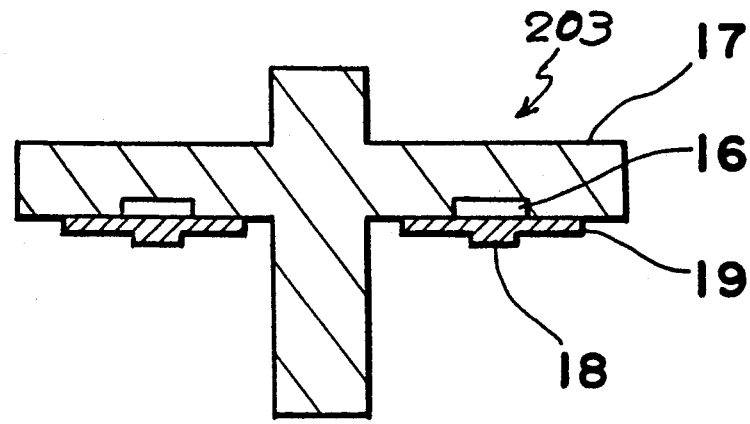
FIG. 17 is a cross-sectional view showing a mover in an ultrasonic motor of a ninth embodiment according to the present invention.
Figure 18:
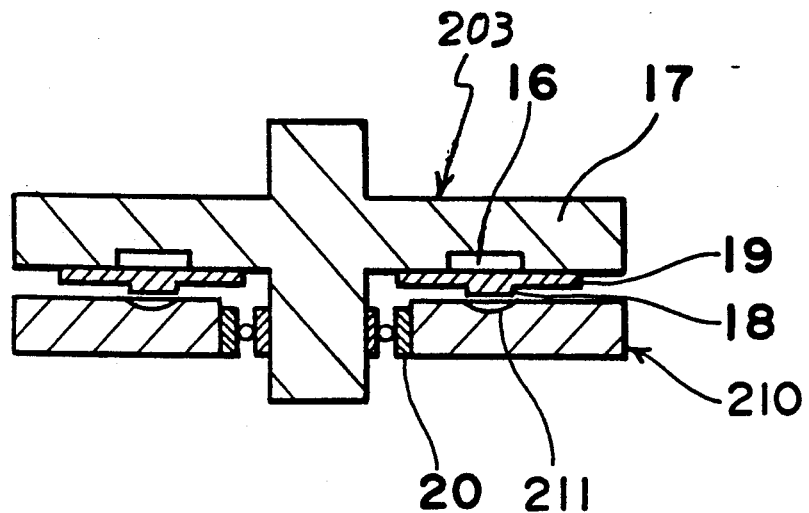
FIG. 18 is a cross-sectional view showing an example of the mover combined with a vibrator in an ultrasonic motor as the ninth embodiment according to the present invention.

FIG. 17 is a cross-sectional view showing a mover 203 in a disk-type ultrasonic motor of a ninth embodiment according to the present invention. The vibrator used in this embodiment is identical to the one illustrated in FIG. 14. FIG. 18 is a cross-sectional view of the ultrasonic motor combining the mover 203 illustrated in FIG. 17 with the vibrator 210 illustrated in FIG. 14. As shown in FIG. 18, bearings 20 are disposed on an inner periphery of the vibrator 210 so that the mover 203 is rotated freely on the bearings 20. As shown in FIG. 17, the mover 203 is composed of a second elastic member 17 with a second recess 16, and a friction material 19 bonded onto the second elastic member 17, wherein the friction material 19 has a ring-like projection 18.

The position of the ring-like projection 18 corresponds to the position of the first recesses 211 of the mover 210 in FIG. 14, and therefore corresponds to the position of maximum vibration displacement in the mode of vibration shown in FIG. 12. Such an arrangement stabilizes the contact position between the vibrator 210 and the mover 203. The friction material 19 absorbs waviness at its both-end fixed anchored points, and at the same time, assures uniform contact along the radial direction. The above projection 18 also reinforces a circumferential bending rigidity of the friction material 19, thereby increasing transmission efficiency of the rotational driving force by means of friction.

The cross-sectional form of the first recesses 11 may be any as shown in one of FIGS. 4 (a), (b), or (c) as already described in the first embodiment. As long as the uniform contact effect and the unwanted standing-wave vibration absorption effect are obtained, the cross-sectional form of the second recess 16 may be any of the forms shown in FIGS. 4 (a), (b), or (c), and other forms such as tapered cutout recesses. The form of the second recess is not limited to that described in the eighth embodiment.

The disk-type ultrasonic motor mentioned above offers the same advantages that the first through eighth embodiments provide. The ring-like projection disposed on the friction material clearly defined the contact area, reducing area contact irregularity between the vibrator 210 and the mover 203. A high output torque and stable ultrasonic motor is thus implemented.

The eighth and ninth embodiments are directed to the disk-type ultrasonic motor. The same structure embodied as above may apply to the ring-type ultrasonic motors in the first through third embodiments.

Figure 19:
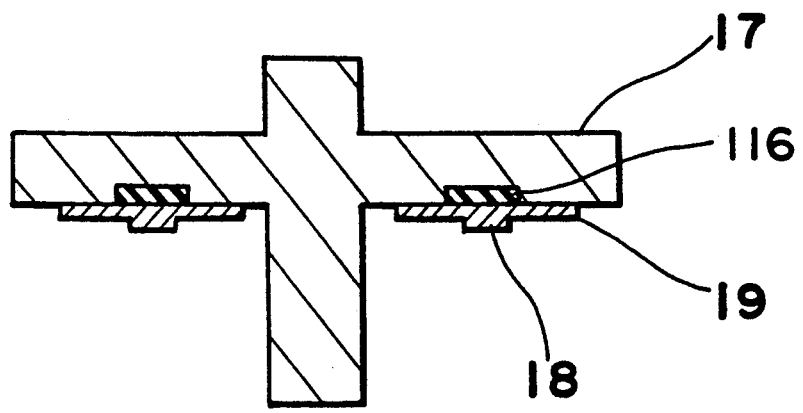
FIG. 19 is a cross-sectional view showing a mover in an ultrasonic motor of a tenth embodiment according to the present invention.

The recesses 7, 107, 11, 111, 211, 15, and 16 are all assumed to be void in the first through ninth embodiments. The recesses 7, 107, 11, 111, 211, 15, and 16, however, may be filled with large internal-loss material, such as rubber material or sponge-like felt material, of which acoustic velocity and elastic modulus are smaller than those of the friction material. Filling the recesses with such a material efficiently absorbs the unwanted standing-wave vibrations. Thus, the recesses 7, 107, 11, 111, 211, 15, and 16 are not limited to void structures. In addition, FIG. 19 shows an example of a mover wherein recesses are filled with rubber 116.

In the present invention, as described above, the use of a plurality of recesses disposed on an elastic member which constitutes a vibrator allows the manufacturing process for an ultrasonic motor to be easy, needing no particularly rigorous machining standards. Furthermore, developing cracks on the bottoms of the recess is prevented because the elastic member has a substantially uniform thickness along a circumferential direction thereof (i.e. a contact face portion of the contact face of the elastic member extends continuously about the circumference thereof). Also, the present invention provides a low-cost, mass production oriented ultrasonic motor, which still features an excellent low-speed operation capability and a cogging-free large-torque output capability. A complex machining process is substantially simplified by disposing a ring-like recess on an elastic member which constitutes a mover and by covering the recess with a friction material. The both-end fixing structure of the friction material relaxes machining accuracy requirements greatly, allowing the motor to meet the motor's shape and dimensions and pressure specifications. Even if the vibrator has a poor flatness accuracy, the friction material anchored at both ends absorbs waviness by deforming itself in response to that waviness. The vibrator thus stays in good contact with the mover, enhancing substantially operational reliability in the ultrasonic motor.

Amplitude variations takes place due to deviation of the resonance frequency of standing waves that developed into travelling waves as a result of driving action by the electrode groups A and B. By causing the amplitude variations to agree with those of an ideal disk-like vibrator, however, the mechanical structure's resonance due to the unwanted standing-wave vibrations is absorbed. Similarly suppressed are audible mechanical noise due to contact irregularity resulting from beat oscillation taking place between the driving frequency and other frequency components of other modes of vibration. The ultrasonic motor, with these advantages according to the present invention, is highly useful in a wide range of industrial applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ultrasonic motor comprising:
a circular vibrator including a circular elastic member and a piezoelectric element attached to said elastic member, said circular vibrator being adapted to have elastic circumferentially travelling waves generated therein as a result of an electric field being applied to said piezoelectric element; and
a movable member mounted relative to said circular vibrator and having a contact face adapted to be pressed into contact with a contact face of said circular elastic member such that said movable member can be moved by said circular vibrator when the elastic circumferentially travelling waves are generated therein;
wherein a plurality of recesses are formed in said contact face of said circular elastic member in such a manner that said contact face includes a contact face portion which extends continuously about a circumference of said circular elastic member;
wherein said circular elastic member of said circular vibrator includes an inner peripheral edge and an outer peripheral edge; and
wherein said recesses extend radially outwardly from said inner peripheral edge but do not reach said outer peripheral edge.

2. An ultrasonic rotor as recited in claim 1, wherein said movable member includes a projected portion projecting from said contact face of said movable member at a radial position corresponding to a radial position of said circular elastic member of said circular vibrator at which said recesses are formed.

3. An ultrasonic motor comprising:
a circular vibrator including a circular elastic member and a piezoelectric element attached to said elastic member, said circular vibrator being adapted to have elastic circumferentially travelling waves generated therein as a result of an electric field being applied to said piezoelectric element;
a movable member mounted relative to said circular vibrator and having a contact face adapted to be pressed into contact with a contact face of said circular elastic member such that said movable member can be moved by said circular vibrator when the elastic circumferentially travelling waves are generated therein;
wherein a plurality of recesses are formed in said contact face of said circular elastic member in such a manner that said contact face includes a contact face portion which extends continuously about a circumference of said circular elastic member;
wherein said circular elastic member of said circular vibrator includes an inner peripheral edge and an outer peripheral edge; and
wherein said recesses extend radially inwardly from said outer peripheral edge but do not reach said inner peripheral edge.

4. An ultrasonic motor as recited in claim 3, wherein said movable member includes a projected portion projecting from said contact face of said movable member at a radial position corresponding to a radial position of said circular elastic member of said circular vibrator at which said recesses are formed.

5. An ultrasonic motor comprising:

a circular vibrator including a first circular elastic member and a piezoelectric element attached to said elastic member, said circular vibrator being adapted to have elastic circumferentially travelling waves generated therein as a result of an electric field being applied to said piezoelectric element; and a movable member mounted relative to said circular vibrator and including a second elastic member having a face confronting a contact face of said first elastic member and a friction member bonded to said face of said second elastic member and adapted to be pressed into contact with said contact face of said first elastic member when the elastic circumferentially travelling waves are generated therein;

wherein said face of said second elastic member has a second member recess formed therein and said friction member is bonded to said face of said second elastic member in covering relation to said second member recess.

6. An ultrasonic motor as recited in claim 5, wherein said second member recess is filled with a large internal-loss material.

7. An ultrasonic motor as recited in claim 6, wherein said large internal-loss material comprises a rubber material.

8. An ultrasonic motor as recited in claim 5, wherein said second member recess comprises a ring-shaped recess.

9. An ultrasonic motor as recited in claim 5, wherein a plurality of first member recesses are formed in said contact face of said first circular elastic member.

10. An ultrasonic motor as recited in claim 9, wherein said friction member includes a projected portion projecting away from said face of said second elastic member of said movable member at a radial position of said second elastic member corresponding to a radial position of said first elastic member at which said first member recesses are formed.

11. An ultrasonic motor as recited in claim 10, wherein said second member recess comprises a ring-shaped recess.

12. An ultrasonic motor as recited in claim 11, wherein said second member recess is filled with a large internal-loss material.

13. An ultrasonic motor as recited in claim 9, wherein said first member recesses are formed in said contact face of said circular elastic member in such a manner that said contact face includes a contact face portion which extends continuously about a circumference of said circular elastic member.

* * * * *